(No Model.)

T. H. BUTLER.
FILTER.

No. 461,234. Patented Oct. 13, 1891.

WITNESSES
Wm E. Harvey
G. Burroughs.

INVENTOR
Thomas H. Butler.
by Herbert W. T. Jenner Attorney

UNITED STATES PATENT OFFICE.

THOMAS H. BUTLER, OF BALTIMORE, MARYLAND.

FILTER.

SPECIFICATION forming part of Letters Patent No. 461,234, dated October 13, 1891.

Application filed February 5, 1891. Serial No. 380,338. (No model.)

*To all whom it may concern:*

Be it known that I, THOMAS H. BUTLER, a citizen of the United States, residing at Baltimore, in the State of Maryland, have invented certain new and useful Improvements in Filters; and I do hereby declare the following to be a full, clear, and exact description of the invention, such as will enable others skilled in the art to which it appertains to make and use the same.

This invention relates to filters; and it consists in the novel construction and combination of the parts, hereinafter fully described and claimed, whereby the filtering material may be cleaned.

Figure 1:
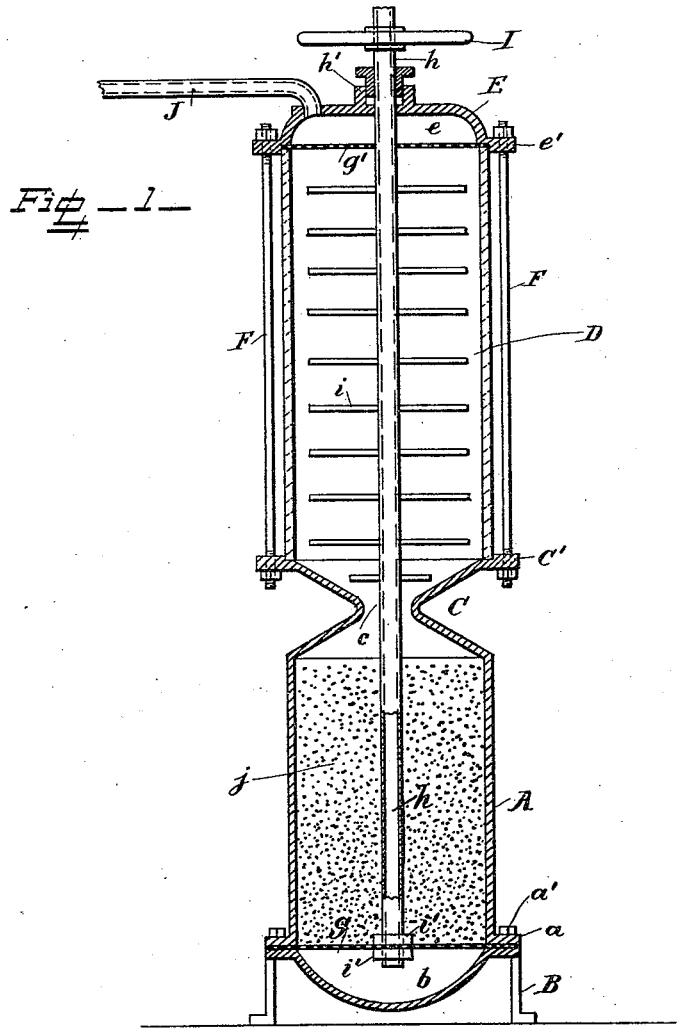
Figure 2:
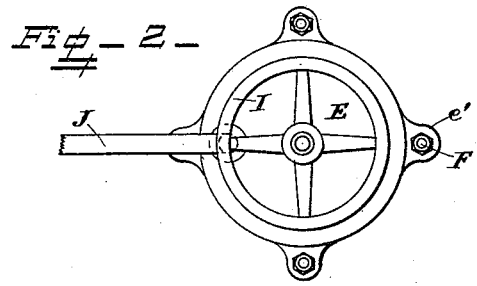

In the drawings, Figure 1 is a vertical section through the filter, and Fig. 2 is a plan view of the same.

The filter is formed of three portions, the lower of which preferably consists of a cylindrical chamber A, of iron or other opaque material, and is provided with a flange $a$ at its lower end and bolts $a'$ for securing it to the stand B, which is provided with the concave chamber $b$.

C is a constricted middle portion at the top of the cylinder A, formed of two cones united at their apices, so as to form a small opening $c$.

$C'$ are lugs at the top of the middle portion C. The middle portion C may be formed integral with the chamber A, as shown in the drawings, or it may be bolted to or otherwise secured to the top of the said chamber.

D is the upper chamber of the filter, preferably consisting of a cylinder of glass or other transparent material.

E is the top of the filter provided with the chamber $e$ and lugs $e'$.

F are bolts which pass through holes in the lugs $e'$ and $C'$, and secure the glass cylinder in position between the top and the middle portion of the filter. A perforated plate $g$ is secured at the bottom of the cylinder A, and a second perforated plate $g'$ is secured at the top of the cylinder D. A pipe or hollow shaft $h$ passes centrally through a stuffing-box $h'$ on the top E and through the opening $c$. The lower end of this pipe is journaled in the lower perforated plate $g$ and is provided with the collars $i'$ to keep it in position longitudinally.

I is a hand-wheel secured on the projecting upper end of the pipe $h$ for revolving it, and $i$ are arms projecting radially from the pipe $h$ inside the cylinder D.

J is a second pipe connected to the top E, and $j$ is the filtering material in the cylinder A. Any approved granular filtering material—such as sand or animal charcoal or a mixture of filtering materials—may be used.

The valves for controlling the admission of water to and the outlet of the water from the filter are not shown in the drawings, as any approved valves may be used.

The filter is operated in the following manner: The water is admitted through the pipe J and passes downward through the filtering material and up through the central pipe $h$, being purified by the filtering material through which it passes. When the filtering material has become charged with impurities the action of the filter is reversed and the water is admitted through the pipe $h$. The water lifts the filtering material and forces it upward through the opening $c$ into the glass cylinder. The narrowness of the opening $c$ causes the filtering material to be mixed up with the water, and the pipe $h$ and the arms $i$ are revolved by means of the hand-wheel to churn up the water in the cylinder D and thoroughly wash all the filtering material. The coherent lumps or cakes of the material are broken up in passing through the opening $c$, and their breaking up is assisted by the grinding action of the pipe which revolves in the said opening. When the filtering material has been thoroughly cleaned the water is again admitted through the pipe J, and the filtering material sinks back into the cylinder A by gravity. The double-cone-shaped form of the constricted portion permits the filtering material to pass from one cylinder to the other with facility, and the perforated plates $c$ and $c'$ prevent the filtering material from being drawn away through the pipes $h$ and J.

What I claim is—

1. In a filter, the combination, with the lower chamber adapted to contain the filtering material, of the upper chamber, a constricted middle portion provided with a small opening and uniting the said chambers, and a stirring device in the upper chamber for agitating the water and washing the filtering material, substantially as set forth.

2. In a filter, the combination, with the lower chamber adapted to contain the filtering material, of the upper chamber, a constricted middle portion provided with a small opening and uniting the said chambers, and a revoluble shaft passing centrally through the said chambers and the said small opening and provided with projecting arms for agitating the water and washing the filtering material, substantially as set forth.

In testimony whereof I affix my signature in presence of two witnesses.

THOMAS H. BUTLER.

Witnesses:
CHAS. J. CARY,
WM. H. JONES.